United States Patent [19]

Hodate

[11] Patent Number: 5,193,387
[45] Date of Patent: Mar. 16, 1993

[54] TIRE-INTERIOR MONITORING APPARATUS

[75] Inventor: Masato Hodate, Higashiyamato, Japan

[73] Assignee: Bridgestone Corporation, Tokyo, Japan

[21] Appl. No.: 744,490

[22] Filed: Aug. 13, 1991

[30] Foreign Application Priority Data

Sep. 26, 1990 [JP] Japan .................. 2-256002

[51] Int. Cl.$^5$ .................. B60C 23/02
[52] U.S. Cl. .................. 73/146.5; 73/146.8; 340/442
[58] Field of Search .......... 73/146.5, 146.8; 340/442; 200/83 R, 61.75, 83 D

[56] References Cited

U.S. PATENT DOCUMENTS

| 4,567,459 | 1/1986 | Folger et al. ............ 73/146.5 |
| 4,935,738 | 6/1990 | Pilato .................. 63/146.5 |
| 5,055,775 | 10/1991 | Scherz et al. ............ 336/120 |

FOREIGN PATENT DOCUMENTS 49-128777 12/1974 Japan .
50-115980 9/1975 Japan .
51-9859 1/1976 Japan .
52-40383 3/1977 Japan .
58-12097 1/1983 Japan .
62-218208 9/1987 Japan .
62-257039 11/1987 Japan .
63-501065 4/1988 Japan .
64-32142 2/1989 Japan .

*Primary Examiner*—Donald O. Woodiel
*Attorney, Agent, or Firm*—Oliff & Berridge

[57] ABSTRACT

An apparatus for monitoring the tire interior by supplying electric power from a power source on a chassis side to a tire-side sensor via a power-supplying coil and a power-receiving coil, and by transmitting a sensor output via a signal-transmitting coil and a signal-receiving coil. The signal-transmitting coil and the power-receiving coil, as well as the signal-receiving coil and the power-supplying coil, are respectively arranged to be substantially concentric in a respective substantially identical plane, and an electromagnetic shielding is provided so as to prevent noise from being mixed in the sensor output. The arrangement makes compact a coupling portion on the chassis side and a coupling portion on the tire side.

8 Claims, 13 Drawing Sheets

TIRE-INTERIOR MONITORING APPARATUS

BACKGROUND OF THE INVENTION

1. Field of the Invention

The present invention relates to a tire-interior monitoring apparatus, and more particularly to a tire-interior monitoring apparatus for constantly monitoring the tire interior by detecting the physical parameters thereof, such as the air pressure and temperature within the tire of vehicles using pneumatic tires, including automobiles, tire-type streetcars, tire-type construction vehicles, aircraft, and the like.

2. Description of the Related Art

In light of the safe operation of vehicles using pneumatic tires, it is desirable to monitor physical parameters of the tire interior, such as the air pressure and temperature within the tire when the wheels are rotating or stationary. For this purpose, devices for alarming an abnormality of the air pressure of a tire have hitherto been proposed which are adapted to issue an alarm when the air pressure of a tire has declined below a predetermined level (Japanese Patent Application Laid-Open Nos. 51-9859, 50-115980, 52-40383, 62-218208, 62-257039, and 49-128777). The following methods are known among the types of devices for indicating an abnormality of the air pressure of a tire: A resonance method in which a resonance circuit mounted on a tire wheel and including a pressure switch is electromagnetically connected through a coil to a resonance circuit mounted on a chassis to thereby transmit a detected signal, and a method in which a detected signal is transmitted optically. With the apparatus using the resonance method, only small electric power is generated in the resonance circuit mounted on the tire wheel. Therefore, it is difficult to actuate a sensor and active elements mounted on the tire wheel, so that the pressure switch is only turned on and off by a predetermined air pressure of the tire, and it is difficult to constantly monitor the internal air pressure of the tire. In addition, with the optical method, an explosive light-emitting device is made to emit light when the air pressure of the tire has dropped below a predetermined level as to transmit a signal, so as a result, it is difficult to constantly monitor the internal air pressure of the tire.

An apparatus is known for constantly monitoring the air pressure of the tire which employs a mechanically-operated pressure indicator using a Bourdon's tube as well as a bellows which is expanded or contracted with an increase or decrease in the air pressure of the tire (Japanese Patent Application Laid-Open No. 64-32142). However, since the Bourdon's tube and the bellows vibrate as the tire wheel vibrates during its rotation, the detected pressure value varies as a result to the vibrations. Hence, there are drawbacks in that the detection accuracy declines, and that malfunctionings and faults are liable to occur owing to the vibrations.

In addition, another type of signalling apparatus has been proposed in which a power-receiving coil is wound onto an inner periphery of a bead base of a tire rim, and a power-supplying coil is attached to a chassis in face-to-face relation with the power-receiving coil (Japanese National Publication: translated version No. 63-501065 of international application under Patent Cooperation Treaty and U.S. Pat. No. 4,567,459). The arrangement provided is such that an electromotive force is generated in a tire-side section of the apparatus through mutual inductance between the two coils, an electronic circuit on the tire side including active elements is actuated by this electromotive force, and the tire pressure is finally displayed on the instrument panel near the driver seat, or an alarm is issued. With this arrangement, in the case of small tire wheels used in passenger cars or the like, the tire wheels can be handled manually during the mounting and dismounting thereof without causing damage to the power receiving coil wound onto the bead base. However, in the case of large tire wheels used in such as trucks, buses, construction vehicles, streetcars, and aircraft, the tire wheels are large and heavy, so that such tire wheels are in most cases handled by using a special tool during the mounting and dismounting with respect to the axles. Accordingly, it is very difficult to handle such tire wheels without causing damage to the power-receiving coil. In addition, although still another type of monitoring apparatus is known in which electric power is supplied to the tire wheel-side section of the apparatus by using a slip ring (Japanese Patent Application Laid-Open No. 58-12097), since the slip ring becomes worn, it is difficult to supply electric power on a stable basis over extended periods of time. Furthermore, as shown in the publication disclosing the aforementioned abnormality signalling apparatus, it is conceivable to supply electric power to the tire wheel-side sensor by mounting a battery on the tire wheel side, but it is still difficult to monitor the air pressure of the tire on a stable basis over extended periods of time owing to the consumption of the battery.

For this reason, the present inventor has proposed an internal-tire-pressure displaying and/or signalling apparatus capable of constantly monitoring the physical parameters of the tire interior, such as the air pressure, by supplying stable electric power to a detector disposed in the tire. This apparatus has a coupling device for coupling a rotating section to a non-rotating section thereof. The coupling device comprises an inner cylinder and an outer cylinder that are disposed concentrically relative to each other. A group of power supply coils including a power-receiving coil and a power-supplying coil are wound on the inner cylinder and outer cylinder, respectively, so as to supply electric power, and a group of signal transmission coils including a signal-transmitting coil and a signal-receiving coil are wound thereon so as to supply a signal. Since coils are thus wound on the inner and outer cylinders, handling is facilitated as compared with the technique in which the power-receiving coil and the like are wound onto the inner periphery of the aforementioned bead base. In addition, since the group of signal transmission coils and the group of power supply coils are disposed in such a manner as to be spaced apart from each other by a predetermined distance (e.g. 25 mm) in the direction of a rotational axis of the tire wheel, the electromagnetic effect of the group of power supply coils on the group of signal transmission coils, i.e., so-called crosstalk, can be prevented from occurring, thereby transmitting a signal with high accuracy.

However, with the above-described technique proposed by the present inventor, although the above-described advantage can be obtained, the following drawback is encountered: Since the length, in the direction of the rotational axis of the tire wheel, of the coupling device for coupling a rotating section and a non-rotating section of the apparatus is made long to prevent crosstalk, it is difficult to mount the apparatus on a vehicle limited in the vehicle width or a vehicle not provided with a sufficient clearance between a mounting surface on the rotating side and a mounting surface on the non-rotating side, such as special tire-type electric vehicles and aircraft.

SUMMARY OF THE INVENTION

Accordingly, it is an object of the present invention to provide a tire-interior monitoring apparatus which can be mounted on virtually all types of vehicles by shortening the length of a coupling portion in the direction of a rotational axis of a tire wheel, thereby overcoming the above-described drawbacks of the conventional art.

To this end, in accordance with the present invention, there is provided a tire-interior monitoring apparatus, comprising: a detector for detecting a physical parameter of the interior of a tire; a group of signal transmission coils including a signal-transmitting coil and a signal-receiving coil that are disposed in such a manner as to be rotatable relative to each other, the group of signal transmission coils being arranged such that a signal corresponding to the physical parameter detected by the detector is transmitted from the signal-transmitting coil to the signal-receiving coil through mutual induction; and a group of power supply coils including a power-supplying coil and a power-receiving coil that are disposed in such a manner as to be rotatable relative to each other, the group of power supply coils being arranged such that an electromotive force is generated in the power-receiving coil through mutual induction so as to supply electric power to the detector, wherein the signal-transmitting coil and the power-receiving coil are arranged to be substantially concentric in a substantially identical plane, and the signal-receiving coil and the power-supplying coil are arranged to be substantially concentric in a substantially identical plane, an electromagnetic shielding being provided between the group of signal transmission coils and the group of power supply coils by an electric conductor.

The detector of the present invention detects at least one of the internal air pressure of the tire, the internal air temperature of the tire, and the temperature of an inner wall of the tire. The group of signal transmission coils includes a signal-transmitting coil and a signal-receiving coil that are disposed in such a manner as to be rotatable relative to each other, and the group of signal transmission coils is arranged such that a signal corresponding to the physical parameter detected by the detector is transmitted from the signal-transmitting coil to the signal-receiving coil through mutual induction. The group of power supply coils includes a power-supplying coil and a power-receiving coil that are disposed in such a manner as to be rotatable relative to each other, and the group of power supply coils is arranged such that an electromotive force is generated in the power-receiving coil through mutual induction so as to supply electric power to the detector. When monitoring the tire interior in accordance with the present invention, the signal-transmitting coil and the power-receiving coil are disposed on the tire wheel side which is a rotating side, while the signal-receiving coil and the power-supplying coil are disposed on the chassis side which is a non-rotating side. The signal-transmitting coil and the power-receiving coil that are disposed on the tire wheel side are arranged to be substantially concentric in a substantially identical plane, while the signal-receiving coil and the power-supplying coil are arranged to be substantially concentric in a substantially identical plane. Thus, since the coils constituting the group of signal transmission coils and the coils constituting the group of power supply coils are respectively arranged to be substantially concentric in a substantially identical plane, the direction of intervals which need to be expanded in order to prevent crosstalk becomes a radial direction perpendicular to the direction of the rotational axis of the tire wheel. Accordingly, the length, in the direction of the rotational axis of the tire wheel, of the coupling device of the tire-interior monitoring apparatus can be made short, as compared with the case where the group of signal transmission coils and the group of power supply coils are arranged in the direction of the rotational axis of the tire wheel.

In the present invention, an electric conductor is disposed in such a manner that an electromagnetic shielding is provided between the group of signal transmission coils and the group of power supply coils by eddy currents occurring in the electric conductor. Accordingly, even if the distance between the group of signal transmission coils and the group of power transmission coils is shortened, crosstalk does not occur. Therefore, it also becomes possible to shorten the radial length of the coupling device perpendicular to the rotational axis of the tire wheel. As the electric conductor, it is possible to use a material displaying a high magnetic permeability, such as iron, preferably aluminum or an aluminum alloy such as Duralumin using aluminum as a main component.

As described above, in accordance with the present invention, the signal-transmitting coil and the power-receiving coil, as well as the signal-receiving coil and the power-supplying coil, are arranged to be substantially concentric in a substantially identical plane, and an electromagnetic shielding is provided between the group of signal transmission coils and the group of power supply coils. Accordingly, it is possible to obtain the advantage of shortening the length, in the direction of the rotational axis of the tire wheel, of the coupling device of the tire-interior monitoring apparatus without any occurrence of crosstalk.

The above and other objects, features and advantages of the present invention will become more apparent from the following detailed description of the invention when read in conjunction with the accompanying drawings.

DESCRIPTION OF THE PREFERRED EMBODIMENTS

Figure 1:
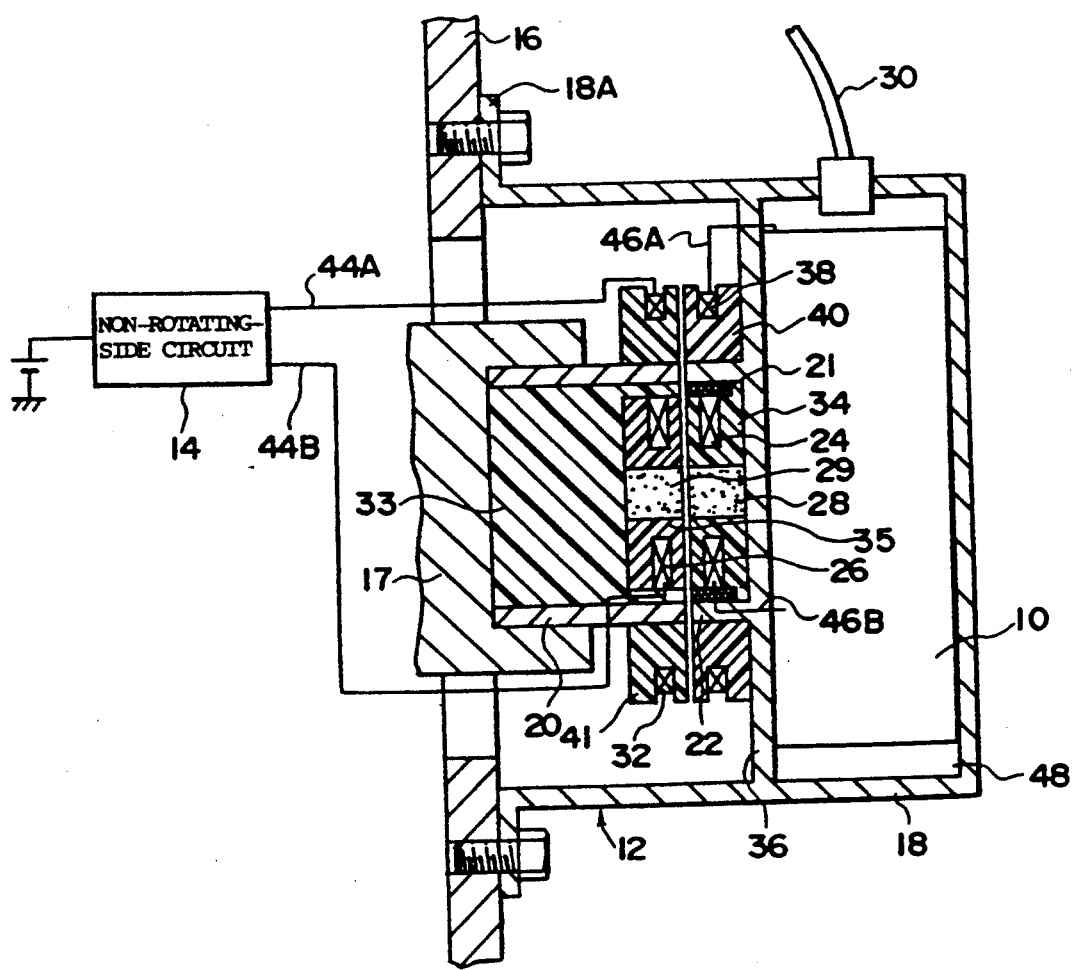
FIG. 1 is a cross-sectional view of a coupling device of a tire-interior monitoring apparatus for monitoring the interior of a tire in accordance with a first embodiment of the present invention.
Figure 2:
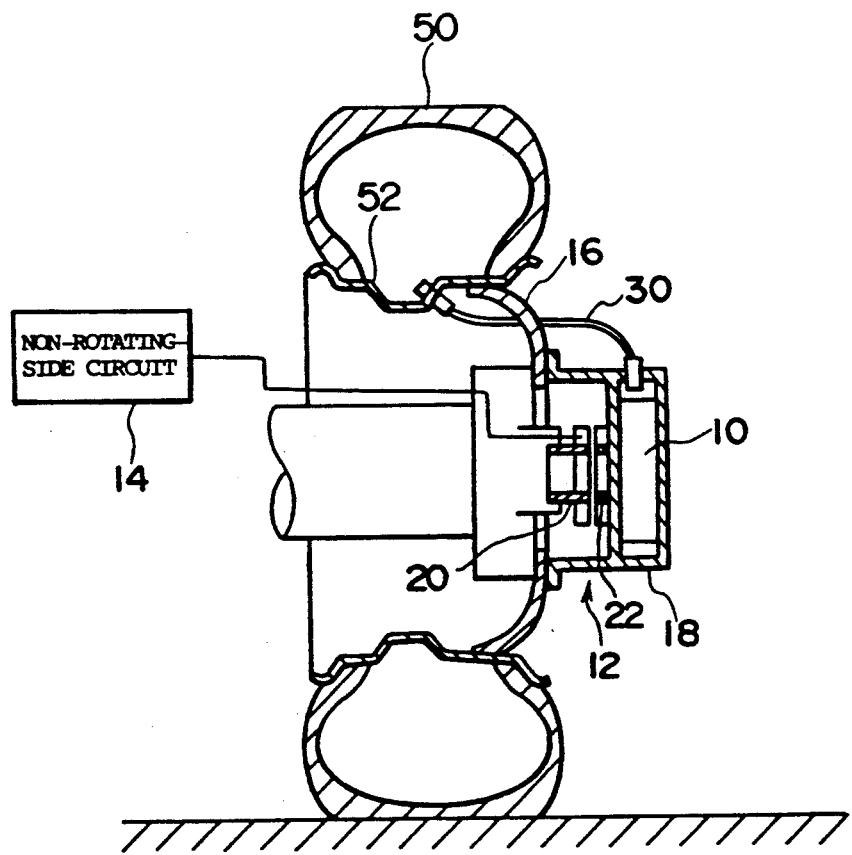
FIG. 2 is a schematic diagram illustrating a state in which the tire-interior monitoring apparatus in accordance with the first embodiment is mounted on a tire wheel assembly.

Referring now to the accompanying drawings, a detailed description will be given of the preferred embodiments of the present invention. FIG. 2 illustrates a state in which a coupling device for coupling a rotating section to a non-rotating section of a tire-interior monitoring apparatus in accordance with a first embodiment of the present invention is mounted on a tire wheel and a non-rotating axle. FIG. 1 shows an enlarged view of the coupling device.

A coupling device 12 comprises an outer cylinder 18 with a bottom having a substantially hollow, cylindrical configuration and an inner cylinder 20 having a smaller diameter than the outer cylinder 18, both outer and inner cylinders 18, 20 being formed of aluminum. The outer cylinder 18 has a flange 18A formed at its rim, and the outer cylinder 18 is affixed to a disk 16 of a tire wheel at the flange 18A by means of bolts. An accommodating section 48 is formed on the bottom side of the interior of the outer cylinder 18 by means of a partition wall 36. Accommodated in the accommodating section 48 is a rotating-side circuit 10 which includes a pressure transducer for converting the internal air pressure of a tire 50 to a voltage, a temperature transducer for converting the air temperature within the tire 50 to a voltage, a power-receiving circuit, and a signal converting/transmitting circuit (circuit board). The accommodating section 48 in the outer cylinder 18 communicates with the interior of the tire 50 by means of a tube 30 disposed in such a manner as to penetrate the outer cylinder 18 and a rim 52. Accordingly, the pressure transducer and the temperature transducer are capable of detecting the internal air pressure and air temperature of the tire from the air inside the tire which is led into the accommodating section via the tube 30.

A hollow, cylindrical coil-winding portion 22 made of aluminum is formed on a surface of the partition wall 36 on the disk 16 side. Accommodated on the inner side of the coil-winding portion 22 is a power-receiving coil 24 wound around a resin-made bobbin 34. The bobbin 34 is secured to the coil-winding portion 22 by means of an adhesive-type resin 21, and a cylindrical core 28 formed of a ferromagnetic material is disposed in a central portion of the bobbin 34. Secured to an outer periphery of the coil-winding portion 22 is a resin-made bobbin 40 around which a signal-transmitting coil 38 is wound. This signal-transmitting coil 38 is arranged to be substantially concentric with the power-receiving coil 24 in a substantially identical plane. The power-receiving coil 24 and the signal-transmitting coil 38 are connected to the rotating-side circuit 10 via lead wires 46A, 46B.

The inner cylinder 20 has the same diameter as the coil-winding portion 22, and the inner cylinder 20 is affixed to a non-rotating axle 17 in such a manner as to oppose the coil-winding portion 22 with a slight gap therebetween. Accommodated on the inner side of the inner cylinder 20 adjacent the power-receiving coil 24 is a power-supplying coil 26 wound around a resin-made bobbin 35, and this bobbin 35 is secured by means of a resin 33. The power-supplying coil 26 has the same diameter as the power-receiving coil 24 and is disposed coaxially with the power-receiving coil 24. A core 29 having the same diameter as the core 28 is disposed in a central portion of the bobbin 35 coaxially with the core 28 in such a manner as to oppose the core 28 with a slight gap therebetween.

A resin-made bobbin 41 around which a signal-receiving coil 32 having the same diameter as the signal-transmitting coil 38 is wound is secured to an outer periphery of the inner cylinder 20. This signal-receiving coil 32 is arranged to be substantially concentric with the power-supplying coil 26 in a substantially identical plane. The signal-receiving coil 32 and the power-supplying coil 26 are connected via lead wires 44A, 44B to a non-rotating-side circuit 14 having a pressure indicator, a temperature indicator, pressure and temperature alarm units, and the like and secured to an instrument panel near the driver seat.

Since the coil-winding portion 22 and the inner cylinder 20 are formed of aluminum, as described above, electromagnetic shielding is provided between the power-receiving coil 24 and the signal-transmitting coil 38 and between the power-supplying coil 26 and the signal-receiving coil 32, respectively.

Figure 3:
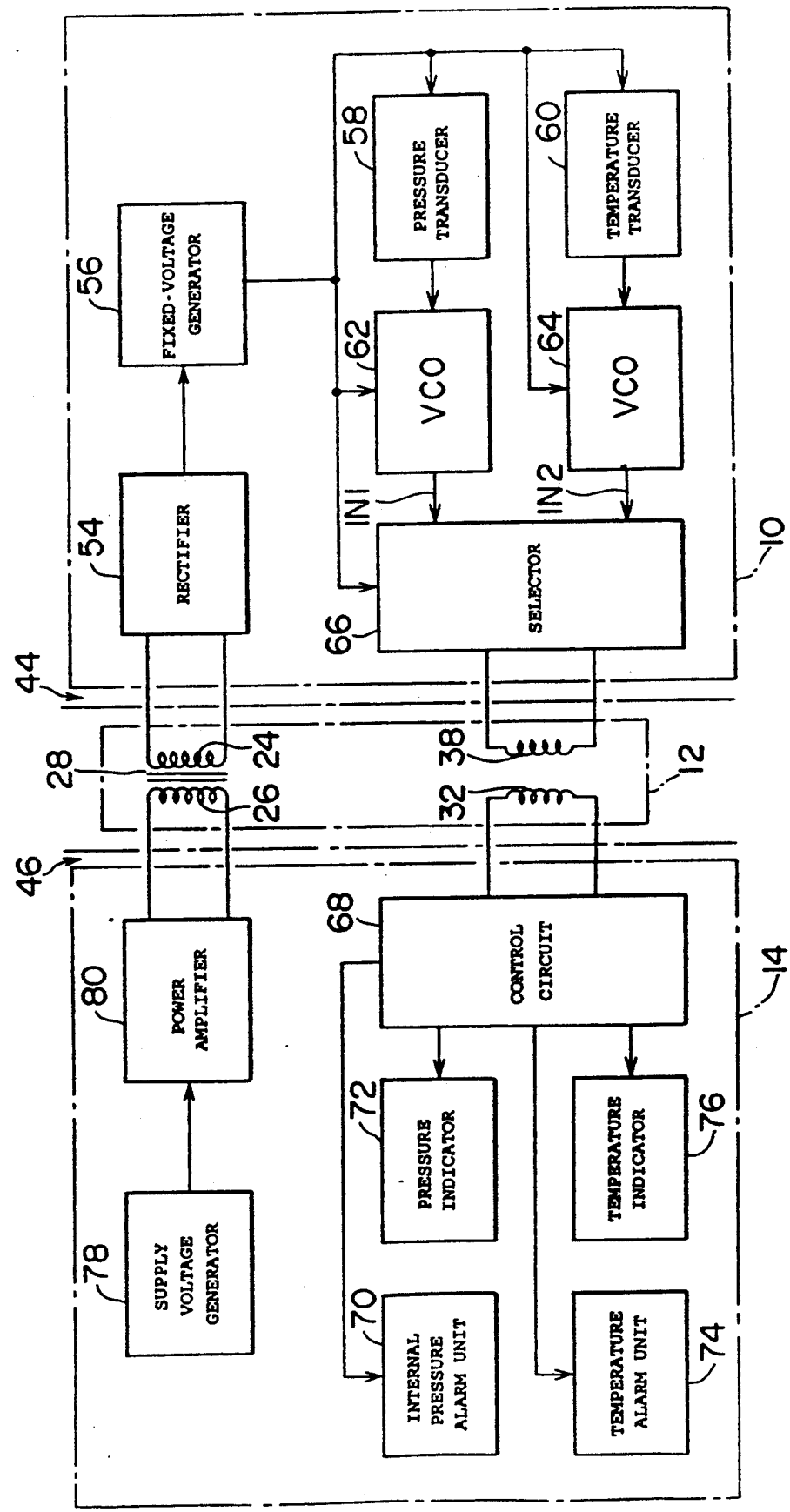
FIG. 3 is a circuit diagram of the tire-interior monitoring apparatus in accordance with the first embodiment.

As shown in FIG. 3, the rotating-side circuit 10 comprises a rectifier 54 connected to the power-receiving coil 24 and adapted to rectify an alternating current into a direct current, and a fixed-voltage generator 56 connected to the rectifier 54 and adapted to generate a fixed DC voltage. In addition, the rotating-side circuit 10 further comprises the following components: a pressure transducer 58 for outputting a voltage proportional to the air pressure, a VCO (voltage-controlled oscillator) 62 for outputting a signal of a frequency proportional to the voltage inputted from the pressure transducer 58, a temperature transducer 60 for outputting a voltage proportional to the air temperature, a VCO 64 for outputting a signal of a frequency proportional to the voltage inputted from the temperature transducer 60, and a selector 66 for selecting from the signals from the VCO 62 and the VCO 64 and outputting the selected signal. The fixed-voltage generator 56 is connected to the pressure transducer 58, temperature transducer 60, VCO 62, VCO 64, and selector 66 so as to supply a fixed voltage thereto, and the selector 66 is connected to the signal-transmitting coil 38.

Meanwhile, the non-rotating-side circuit 14 comprises a supply voltage generator 78 which has a vehicle-mounted battery and a converting circuit for converting a direct current to an alternating current, and a power amplifier 80 for amplifying the alternating current outputted from the supply voltage generator 78 and for supplying the same to the power-supplying coil 26. In addition, the non-rotating-side circuit 14 has a control circuit 68 connected to the signal-receiving coil 32. Connected to the control circuit 68 are a pressure indicator 72 for displaying an air pressure detected by the pressure transducer 58, an internal pressure alarm unit 70 for issuing an alarm when the air pressure has dropped below a predetermined level, a temperature indicator 76 for indicating an air temperature detected by the temperature transducer 60, and a temperature alarm unit 74 for issuing an alarm when the air temperature has risen above a predetermined level. The aforementioned signal-transmitting and -receiving coils constitute a group of signal transmission coils, while the power-supplying and -receiving coils constitute a group of power supply coils in accordance with the present invention.

Figure 4:
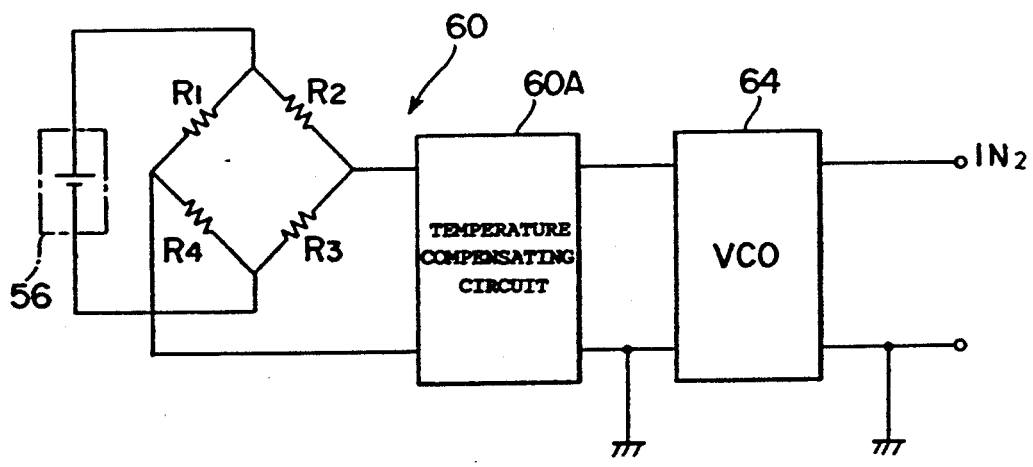
FIG. 4 is a circuit diagram of a temperature transducer.

As shown in FIG. 4, the temperature transducer 60 comprises a resistor-type sensor constituted by a bridge circuit including resistors R1, R2, R3, and R4, and a temperature compensating circuit 60A having an amplification function. It should be noted that a thermocouple-type sensor, a thermistor-type sensor, or the like may be used instead of the resistor-type sensor. In addition, as the pressure transducer 58, it is possible to use a sensor in which a strain gage is connected in the form of a bridge, a semiconductor strain resistor-type sensor, or the like.

Figure 5:
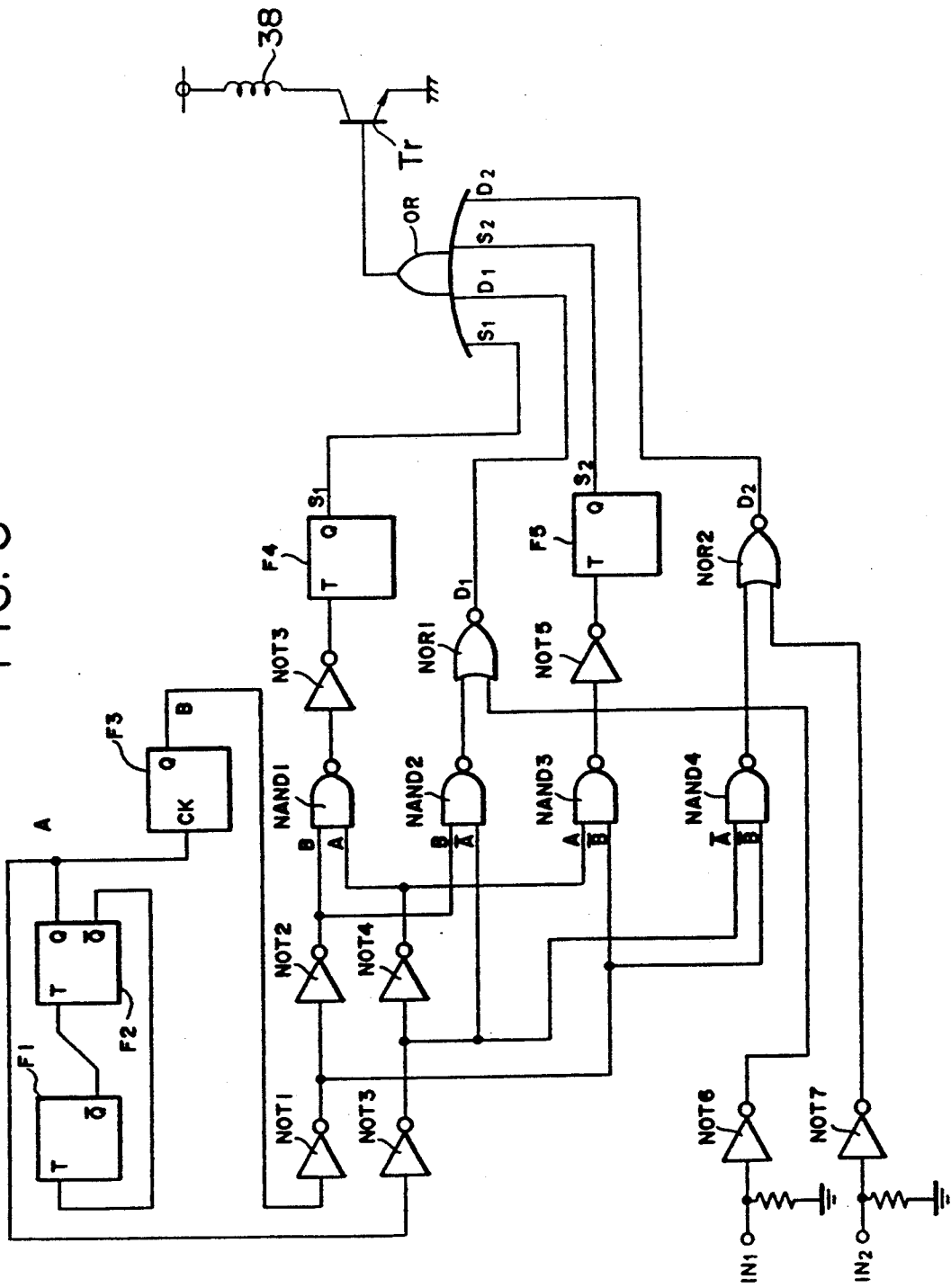
FIG. 5 is a circuit diagram illustrating details of a selector shown in FIG. 3.

As shown in FIG. 5, the selector 66 comprises flip-flops F1, F2, F3, F4, and F5, NOT circuits NOT1, NOT2, NOT3, NOT4, NOT5, NOT6, and NOT7, NAND circuits NAND1, NAND2, NAND3, and NAND4, and NOR circuits NOR1, NOR2. Output terminals of the flip-flops F4, F5 and the NOR circuits NOR1, NOR2 are connected to input terminals of an OR circuit OR. An output terminal of the OR circuit OR is connected to the base of a transistor Tr whose emitter is grounded. The collector of the transistor Tr is connected to the fixed voltage generator 56 via the signal-transmitting coil 38. In addition, the input terminal of the NOT circuit NOT6 is connected to the VCO 62, while the input terminal of the NOT circuit NOT7 is connected to the VCO 64.

Figure 6:
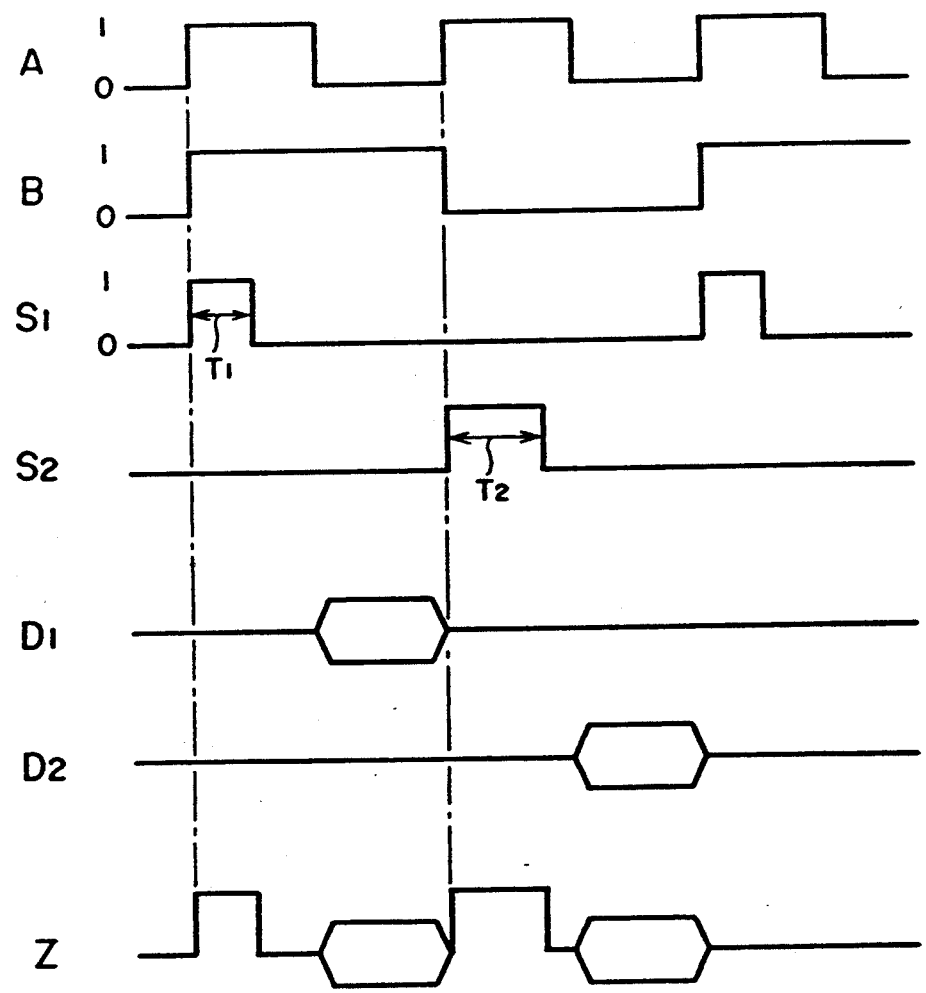
FIG. 6 is a diagram illustrating waveforms of various component parts shown in FIG. 5.

A description will now be given of the operation of this selector 66. A pulse signal A, shown in FIG. 6, is outputted from a Q terminal of the flip-flop F2, while a pulse signal B, shown in FIG. 6, is outputted from a Q terminal of the flip-flop F3. When the pulse signal A rises, and the pulse signal B rises, a pulse signal S1 with a pulse width T1 is outputted from a Q terminal of the flip-flop F4. In addition, when the pulse signal A rises and the pulse signal B falls, a pulse signal S2 with a pulse width T2 is outputted from a Q terminal of the flip-flop F5. A detection signal IN1 outputted from the VCO 62 is inverted by the NOT circuit NOT6, and is then inputted to the NOR circuit NOR1. Accordingly, during the time when the pulse signal A is at low level and the pulse signal B is at high level, an inverted detection signal D1 is outputted from the NOR circuit NOR1. In addition, a detection signal IN2 outputted from the VCO 64 is inverted by the NOT circuit NOT7, and is then inputted to the NOR circuit NOR2. Accordingly, during the time when the pulse signal A is at low level and the pulse signal B is at low level, an inverted detection signal D2 is outputted from the NOR circuit NOR2. Since the pulse signals S1, S2 and the inverted detection signals D1, D2 are inputted to the OR circuit OR, a signal Z shown in FIG. 6 is outputted from the OR circuit. The transistor Tr is turned on and off in response to this signal, and the signal-transmitting coil 38 is energized by a current corresponding to the turning on and off of the transistor Tr.

Figure 7:
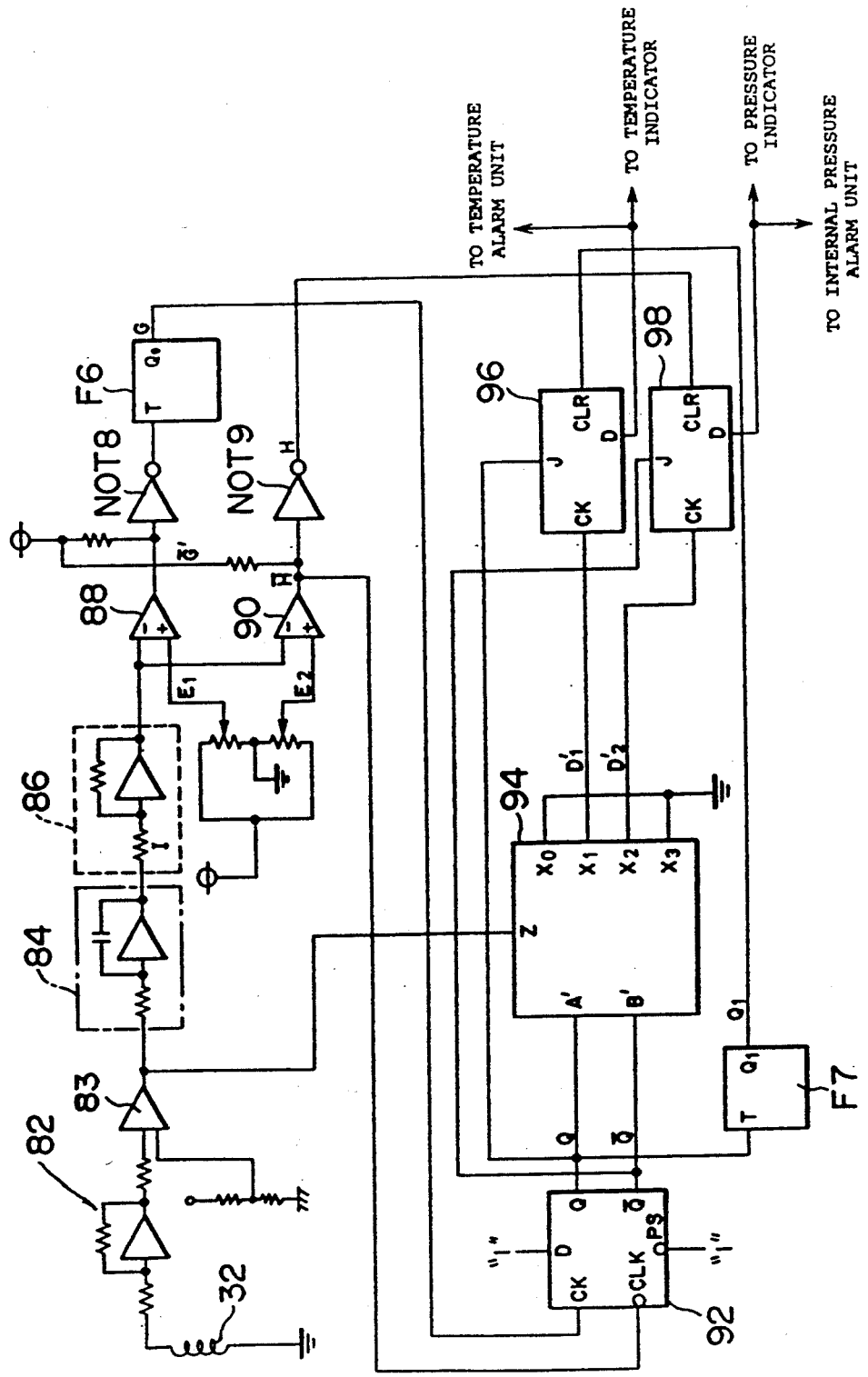
FIG. 7 is a diagram illustrating details of a control circuit shown in FIG. 3.

As shown in FIG. 7, the control circuit 68 comprises an inversion amplifier 82 and a comparator 83 that are connected to the signal-receiving coil 32. An output terminal of the comparator 83 is connected to a switching circuit 94, and is connected to inversion terminals of a group of comparators 88, 90 via an integrator 84 and a code converter 86. A reference voltage E1 is supplied to a non-inversion terminal of the comparator 88, while a reference voltage E2 is supplied to a non-inversion terminal of the comparator 90. An output terminal of the comparator 88 is connected to a clock terminal CK of a storage element 92 via the NOT circuit NOT8 and the flip-flop F6. An output terminal of the comparator 90 is connected to a clear terminal CLR of the storage element, 92, and is connected to a clear terminal CLR of a counter 98 via the NOT circuit NOT9. A Q terminal of the storage terminal 92 is connected to a clear terminal CLR of a counter 96 via the flip-flop F7 and to a control terminal J of the counter 96, and is also connected to the switching circuit 94. A $\overline{Q}$ terminal of the storage element 92 is connected to a control terminal J of the counter 98 and to the switching circuit 94. A terminal X1 of the switching circuit 94 is connected to a clock terminal CK of the counter 96, while a terminal X2 thereof is connected to a clock terminal CK of the counter 98. An output terminal D of the counter 96 is connected to the temperature indicator and the temperature alarm unit, while an output terminal d of the counter 98 is connected to the pressure indicator and the internal pressure alarm unit.

Figure 8:
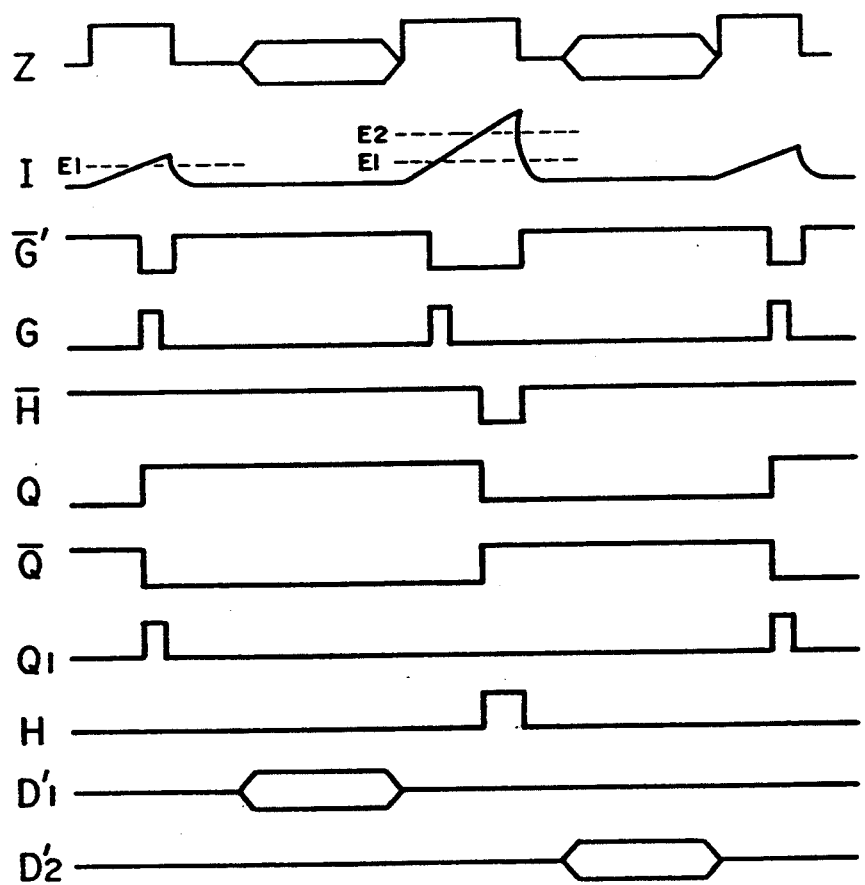
FIG. 8 is a diagram illustrating timing charts of various component parts shown in FIG. 7.

A description will now be given of the operation of the control circuit 68. When the signal-transmitting coil (FIG. 5) is energized by a current shown by the signal Z shown in FIG. 6, an induced current flows across the signal-receiving coil 32, and the signal Z shown in FIG. 8 is outputted from the comparator 83. This signal Z is integrated by the integrator 84, and its code is inverted by the code converter 86 and is then inputted to the inversion terminals of the comparators 88, 90. The comparator 88 compares the output of the code converter 86 with the reference voltage E1, and outputs a signal $\overline{G}'$ which is shown in FIG. 8 and is at low level when the output of the code converter 86 is not less than the reference voltage E1. This signal $\overline{G}'$ is inverted by the NOT circuit NOT8 and is inputted to the flip-flop F6, so that a signal G shown in FIG. 8 is outputted from the flip-flop F6. The comparator 90 compares the output of the code converter 86 and the reference voltage E2, and outputs a signal $\overline{H}$ which is shown in FIG. 8 and is at low level when the output of the code converter 86 is not less than the reference voltage E2. This signal $\overline{H}$ is inverted to a signal H by the NOT circuit NOT9, and is then inputted to the clear terminal CLR of the counter 98.

Since the signal G is inputted to the clock terminal CK of the storage element 92, and the signal $\overline{H}$ is inputted to the clear terminal CLR thereof, the storage element 92 outputs from its Q terminal a signal Q which is at high level when the signal G rises and is at low level when the signal $\overline{H}$ falls, while the storage element 92 outputs from its $\overline{Q}$ terminal a signal $\overline{Q}$ in which the signal Q is inverted. The signal Q is inputted to the control terminal J of the counter 96, while the signal $\overline{Q}$ is inputted to the control terminal J of the counter 98. The counters 96, 98 operate only when the signals inputted to their control terminals J are at high level. During operation, the counter 96 counts a signal D1' of a frequency proportional to the air pressure outputted from the X1 terminal of the switching circuit 94, while the counter 98 counts a signal D2' of a frequency proportional to the air temperature outputted from the terminal X2 of the switching circuit 94. Then, the counter 96 is cleared each time the signal Q1 outputted from the Q1 terminal of the flip-flop F7 rises, while the counter 98 is cleared each time the signal H rises.

The count value outputted from the output terminal D of the counter 96 is supplied to the temperature indicator to display a temperature corresponding to the count value. At the same time, the same count value outputted therefrom is also supplied to the temperature alarm unit, and when the count value is not less than a predetermined count value, an alarm is issued from the alarm unit. Meanwhile, the count value outputted from the output terminal D of the counter 98 is supplied to the pressure indicator to display a pressure corresponding to the count value. At the same time, the same count value outputted therefrom is also supplied to the internal pressure alarm unit, and when the count value is not less than a predetermined count value, an alarm is issued from the internal pressure alarm unit.

A description will now be given of the operation of this embodiment. The AC power generated by the supply voltage generator 78 is amplified by the power amplifier 80, and is supplied to the power-supplying coil 26. An electromotive force is generated in the power-receiving coil 24 owing to mutual inductance relative to the power-supplying coil 26. Since AC power is supplied to the power-supplying coil, even when the tire wheel is at a standstill, it is possible to generate an electromotive force. This electromotive force, after being rectified by the rectifier 54, is converted to a fixed DC voltage by the fixed voltage generator 56, and is supplied to the various circuits of the rotating-side circuit 10. The air pressure detected by the pressure transducer 58 is converted by the VCO 62 to a signal of a frequency proportional to the air pressure, and is then inputted to the selector 66. The air temperature detected by the temperature transducer 60 is converted by the VCO 64 to a signal of a frequency proportional to the air temperature, and is then inputted to the selector 66. The selector 66 causes the signal-transmitting coil 38 to be energized or de-energized by the serial signal Z shown in FIG. 6. A current shown by the signal Z in FIG. 8 flows across the signal-receiving coil 32 by means of mutual induction. The control circuit 68 counts the signal outputted from the VCO 62 and having a frequency proportional to the air pressure, also counts the signal outputted from the VCO 64 and having a frequency corresponding to the air temperature, and causes the pressure indicator 72 to display the air pressure and the temperature indicator 76 to display the air temperature. In addition, the internal pressure alarm unit 70 issues an alarm when the count value supplied from the control circuit 68 and corresponding to the air pressure is not more than a predetermined value. Meanwhile, the temperature alarm unit 74 issues an alarm when the count value supplied from the control circuit 68 and corresponding to the air temperature is not less than a predetermined value.

Figure 9:
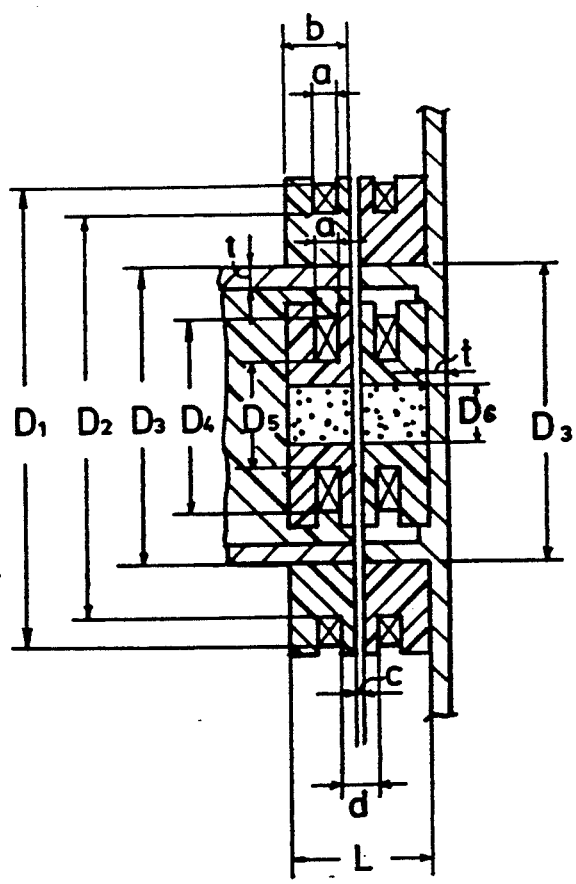
FIG. 9 is a diagram illustrating dimensions of various component parts in accordance with the first embodiment.

When dimensions of the various component parts shown FIG. 9 were set as listed below, and an alternating current with a maximum voltage of 25 V, a maximum current of 200 mA, and a frequency of 100 kHz was supplied to the power-supplying coil, a direct current with a voltage of 12 V and a current of 30 mA was obtained from the rectifier. When a signal of 100 pulses/sec (corresponding to 1 kgf/cm² in terms of air pressure) was supplied to the signal-transmitting coil, a signal with a maximum voltage of approx. 2 V was obtained at the signal-receiving coil. The voltage of noise at that time was 0.1 V or less.

| | | |
|---|---|---|
| D1 | (outside diameter of the group of signal transmission coils) | = 48 mm |
| D2 | (inside diameter of the group of signal transmission coils) | = 44 mm |
| D3 | (outside diameter of the coil-winding portion and inner cylinder) | = 36 mm |
| D4 | (outside diameter of the group of power supply coils) | = 26 mm |
| D5 | (inside diameter of the group of power supply coils) | = 18 mm |
| D6 | (outside diameter of the core) | = 10 mm |
| t | (thickness of aluminum material) | = 2.0 mm |
| a | (axial length of each coil) | = 0.7 mm |
| b | (axial length of each bobbin) | = 5 mm |
| c | (gap between the inner cylinder and the coil-winding portion) | = 0.5 mm |
| d | (axial gap between adjacent coils) | = 1.7 mm |

$L = 2b + c = 10.5$ mm

As for the coils, a 0.2-diameter single wire with an insulating coating was used, and the power supply coils were respectively wound by 60 turns, and the signal transmission coils were respectively wound by 30 turns.

As described above, in accordance with this embodiment, the power-receiving coil and the signal-transmitting coil, as well as the power-supplying coil and the signal-receiving coil, are respectively arranged to be substantially concentric in a substantially identical plane, and an aluminum material is interposed between the power-receiving coil and the signal-transmitting coil and between the power-supplying coil and the signal. Accordingly, it is possible to obtain an advantage in that the length, in the direction of the rotational axis of the tire wheel, of the coupling device of the tire-interior monitoring apparatus and the diameter of the coupling device can be made small without any occurrence of crosstalk. In addition, it is possible to obtain another advantage in that the mixing in of external noise can be prevented since the power-receiving coil and the signal-transmitting coil are accommodated within the outer cylinder made of aluminum.

Figure 10:
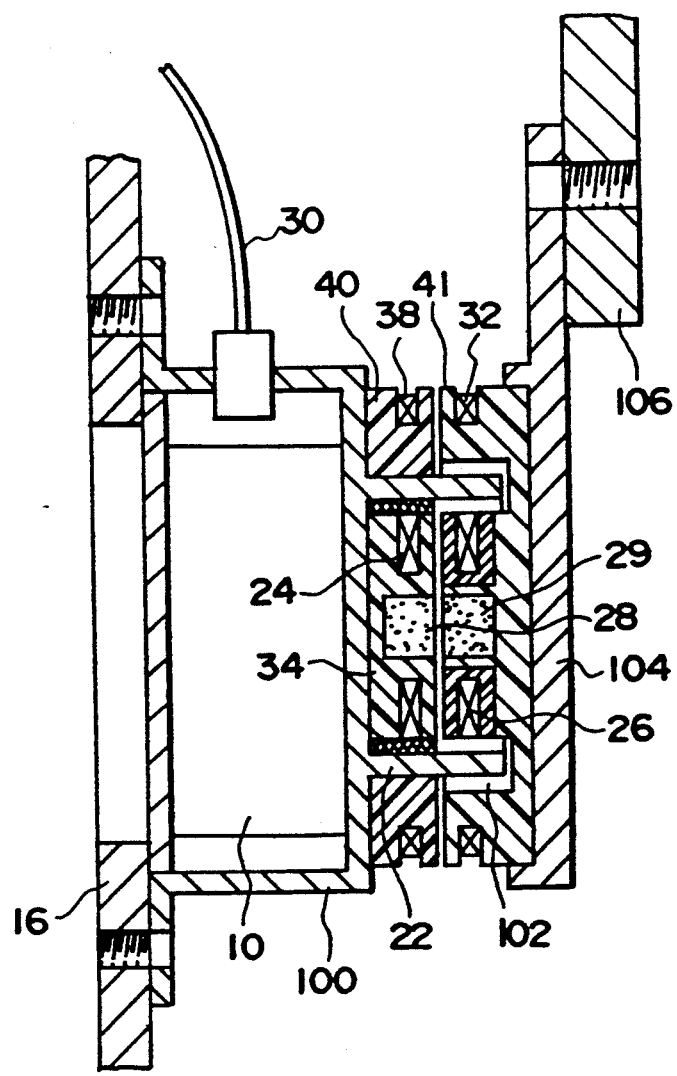
FIG. 10 is a cross-sectional view of a coupling device in accordance with a second embodiment.

FIG. 10 shows a coupling device in accordance with a second embodiment of the present invention suitable for use in a fixed-axle-type vehicle. It should be noted that in FIG. 10 those component parts that correspond to those of FIG. 1 will be denoted by the same reference numerals, and a description thereof will be omitted.

The hollow, cylindrical coil-winding portion 22 made of aluminum is formed on the outer side of a bottom surface of an aluminum-made casing 100 which is secured to the disk 16 and in which the rotating-side circuit 10 is accommodated. At a proximal end portion of the coil-winding portion 22, the signal-transmitting coil 38 and the power-receiving coil 24 are arranged to be substantially concentric in a substantially identical plane. The bobbin 41 is disposed in face-to-face relation with the bobbin 40 around which the signal-transmitting coil 38 wound, with a slight gap therebetween. The power-supplying coil 26 is wound on the bobbin 41 in such a manner as to be substantially concentric with the signal-receiving coil 32 in a substantially identical plane. An annular groove 102 is provided between the signal-receiving coil 32 and the power-supplying coil 26 on the bobbin 41. A distal end portion of the coil-winding portion is inserted into the groove 102 so as to provide an electromagnetic shielding between the signal-receiving coil 32 and the power-supplying coil 26. The bobbin 41 is secured to a chassis 106 via bracket 104.

Figure 11:
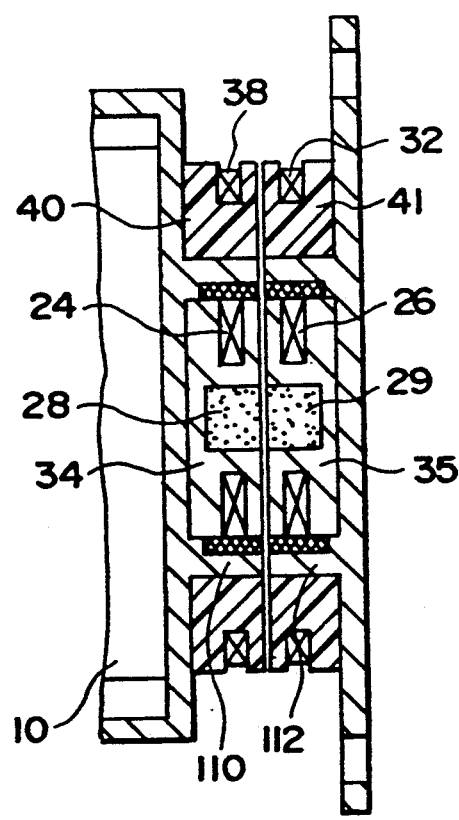
FIGS. 11, 12, and 13 are schematic diagrams illustrating modifications of the coupling device in accordance with the present invention.

FIG. 11 shows a third embodiment of the present invention. In this embodiment, substantially hollow, cylindrical coil-winding portions 110, 112 with a bottom formed of aluminum are arranged in such a manner that their opening sides face each other, and the power-receiving coil 24 and the power-supplying coil 26 are accommodated within the coil-winding portions 110, 112, respectively. In this embodiment, since the power-receiving coil and the power-supplying coil are covered with aluminum except for the gap portion of the coupling device, the electromagnetic shielding effect is further enhanced.

Figure 12:
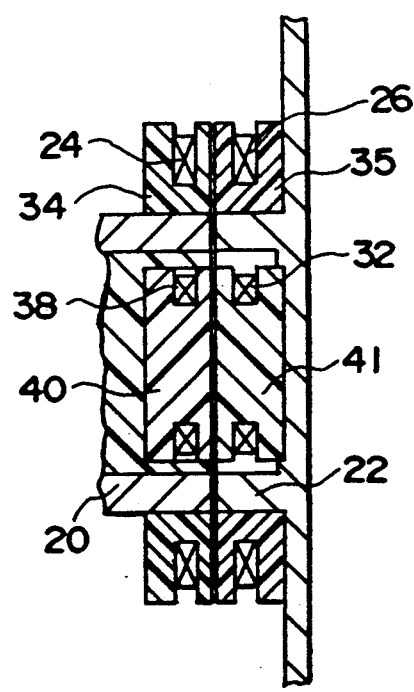

It should be noted that although in the above-described embodiments a description has been given of an example in which the group of signal transmission coils are arranged on the outer side of the group of power supply coils, an arrangement may be provided such that the group of power supply coils are arranged on the outer side of the group of signal transmission coils. The example in which the group of power supply coils are arranged on the outer side of the group of signal transmission coils is shown in FIG. 12.

Figure 13:
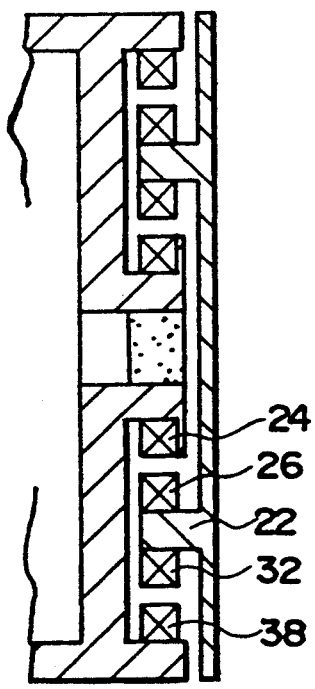

In addition, in the above, a description has been given of an example in which the power-receiving coil and the signal-transmitting coil, as well as the power-supplying coil and the signal-receiving coil, are respectively arranged to be substantially concentric in mutually parallel, different planes. However, as shown in FIG. 13, an arrangement may be alternatively provided such that the four coils, i.e., the power-receiving coil 24, the power-supplying coil 26, the signal-transmitting coil 32, and the signal-receiving coil 38, are arranged to be substantially concentric in a substantially identical plane.

What is claimed is:

1. A tire-interior monitoring apparatus, comprising:
    a detector for detecting a physical parameter of the interior of a tire;
    a group of signal transmission coils including a signal-transmitting coil and a signal-receiving coil that are disposed in such a manner as to be rotatable relative to each other, said group of signal transmission coils being arranged such that a signal corresponding to the physical parameter detected by said detector is transmitted from said signal-transmitting coil to said signal-receiving coil through mutual induction; and
    a group of power supply coils including a power-supplying coil and a power-receiving coil that are disposed in such a manner as to be rotatable relative to each other, said group of power supply coils being arranged such that an electromotive force is generated in said power-receiving coil through mutual induction so as to supply electric power to said detector,
    wherein said signal-transmitting coil, said power-receiving coil, said signal-receiving coil, and said power-supplying coil are arranged to be substantially concentric in a substantially identical plane, said monitoring apparatus further comprising an electric conductor providing an electromagnetic shielding between said group of signal transmission coils and said group of power supply coils.

2. A tire-interior monitoring apparatus according to claim 1, wherein said electric conductor is formed of aluminum or an alloy using aluminum as a main component.

3. A tire-interior monitoring apparatus according to claim 1, wherein said electric conductor comprises a casing disposed on the inner side of either of said group of signal transmission coils or said group of power supply coils, and on the other side of the other of said group of signal transmission coils or said group of power supply coils.

4. A tire-interior monitoring apparatus according to claim 1, wherein said electric conductor comprises a pair of casings that are arranged in the direction of a rotational axis of a tire wheel in such a manner as to be rotatable relative to each other.

5. A tire-interior monitoring apparatus according to claim 4, wherein at least one of said casings is provided with a bottom.

6. A tire-interior monitoring apparatus according to claim 1, wherein the physical parameter includes at least one of an internal air pressure of the tire, an internal air temperature of the tire, and the temperature of an inner wall of the tire.

7. A tire-interior monitoring apparatus according to claim 1, wherein said signal-transmitting coil and said power-receiving coil are disposed on a rotating side, and said signal-receiving coil and said power-supplying coil are disposed on a non-rotating side.

8. A tire-interior monitoring apparatus according to claim 1, further comprising:
    an outer cylinder formed of an electric conductor for covering said group of signal transmission coils and said group of power supply coils.

* * * * *